United States Patent
Denworth et al.

(10) Patent No.: US 11,341,073 B2
(45) Date of Patent: May 24, 2022

(54) REDUNDANT PATHS TO SINGLE PORT STORAGE DEVICES

(71) Applicant: Vast Data Ltd., Tel Aviv (IL)

(72) Inventors: Jeff Denworth, Red Bank, NJ (US); Renen Hallak, Tenafly, NJ (US); Dan Gluskin, Tel Aviv (IL); Alon Horev, Tel Aviv (IL); Yuval Mintz, Herzliya (IL)

(73) Assignee: Vast Data Ltd., Tel Aviv (IL)

( * ) Notice: Subject to any disclaimer, the term of this patent is extended or adjusted under 35 U.S.C. 154(b) by 110 days.

(21) Appl. No.: 16/451,584

(22) Filed: Jun. 25, 2019

(65) Prior Publication Data
US 2020/0409885 A1     Dec. 31, 2020

(51) Int. Cl.
*G06F 13/40*     (2006.01)
*G06F 13/16*     (2006.01)

(52) U.S. Cl.
CPC ...... *G06F 13/4022* (2013.01); *G06F 13/1684* (2013.01)

(58) Field of Classification Search
CPC .................. G06F 13/4022; G06F 13/1684
See application file for complete search history.

(56) References Cited

U.S. PATENT DOCUMENTS

| | | | |
|---|---|---|---|
| 6,742,017 B1 * | 5/2004 | Black | G06F 13/4022 707/999.2 |
| 7,356,636 B2 | 4/2008 | Torudbakken et al. | |
| 9,043,526 B2 | 5/2015 | Freking et al. | |
| 2015/0370665 A1 * | 12/2015 | Cannata | G06F 3/0685 714/4.11 |
| 2016/0154765 A1 * | 6/2016 | Shin | G06F 13/4295 710/302 |

* cited by examiner

*Primary Examiner* — Idriss N Alrobaye
*Assistant Examiner* — Brooke J Taylor
(74) *Attorney, Agent, or Firm* — M&B IP Analysts, LLC

(57) ABSTRACT

A storage system is provided. The storage system includes a backplane; a plurality of single port storage devices; and a plurality of controllers, wherein the backplane routes a plurality of interconnection lanes between the plurality of controllers and the plurality of single port storage devices, wherein the plurality of controllers is configured to: enable at least one second interconnection lane of the plurality of interconnection lanes when a first controller of the plurality of controllers has failed, wherein a first interconnection lane of the plurality of interconnection lanes is between the first controller and a first single port storage device of the plurality of single port storage devices, wherein the at least one second interconnection lane is between a second controller of the plurality of controllers and the first single port storage device.

22 Claims, 5 Drawing Sheets

REDUNDANT PATHS TO SINGLE PORT STORAGE DEVICES

TECHNICAL FIELD

The present disclosure relates generally to providing high availability of storage systems, and more specifically high-availability using enclosures with passive and/or switch-less backplanes and single-port drives.

BACKGROUND

A backplane is a group of parallel electrical connectors used to connect disparate circuit boards to create a larger computer system. A passive backplane includes only the connectors and minimal, if any, additional circuitry. For example, a passive backplane may include only passive electrical components such as printed circuit boards (PCBs), connectors, resistors, and capacitors. Especially, a passive backplane does not include any active components which run firmware like central processing units (CPUs), peripheral component interconnect (PCI) switches, or ASICs that are more prone to bugs and failures. Therefore, passive backplanes are considered to be more robust than active backplanes.

Redundancy schemes such as redundant array of independent disks (RAID) and erasure coding schemes involve distributing data across multiple storage nodes to allow for data recovery in the event of a failure of one or more of the storage nodes.

One existing solution utilizing redundancy schemes is to spread data among different storage enclosures. Each enclosure has respective drive bays and controllers (also known as hosts) to allow remote access to drives. This configuration must be considered by the erasure coding scheme. For example, when a system has 5 enclosures, the erasure coding scheme may either be a 4+1 scheme with 25% overhead that can sustain one enclosure loss or a 3+2 scheme with 66% overhead that can sustain two enclosure losses. Enclosure-level redundancy with reasonable overhead is possible only for large installations with many enclosures.

Another existing solution utilizing redundancy schemes is to have a highly available enclosures with two redundant controllers using dual port drives. Such an enclosure can be built without any single point of failure. A highly available enclosure can provide access to its disks even during failures such as, for example, a single controller going offline, a single power supply failure, or a single network link failure. The RAID scheme, in this case, can be applied on the drive level rather than on the enclosure level. For example, a system with two controllers and 24 dual port drives can use a 22+2 redundancy scheme with 9% overhead. As a result, such a system can sustain two drive failures, a single controller failure, or both. The only non-hot-swappable components in such an enclosure are the backplanes and therefore, using a passive backplane dramatically increase the robustness of the solution.

Drawbacks of the existing solutions include complexity and cost. Specifically, the drives' firmware and internal structures should support working with two controllers simultaneously (dual port). This arrangement is considerably more complex than working with a single controller. The additional drive complexity, as well as marketing positioning, typically means that dual port drives are considerably more expensive than standard single port drives. Furthermore, given that single port drives are much more common, in many cases, new storage technologies are typically first introduced as single port drives and only later (if at all), are adapted to use dual port drives.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a storage system. The storage system comprises: a backplane; a plurality of single port storage devices; and a plurality of controllers, wherein the backplane is configured to route a plurality of interconnection lanes between the plurality of controllers and the plurality of single port storage devices, wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to: cause connectivity between the plurality of single port storage devices and at least one network; and enable at least one second interconnection lane of the plurality of interconnection lanes when a first controller of the plurality of controllers has failed, wherein a first interconnection lane of the plurality of interconnection lanes is between the first controller and a first single port storage device of the plurality of single port storage devices, wherein the at least one second interconnection lane is between a second controller of the plurality of controllers and the first single port storage device.

Certain embodiments disclosed herein a method for redundant control over single port storage devices. The method comprises: enabling at least one second interconnection lane of a plurality of interconnection lanes when a first controller of a plurality of controllers has failed, wherein a first interconnection lane of the plurality of interconnection lanes is between the first controller and a first single port storage device of a plurality of single port storage devices, wherein the at least one second interconnection lane is between a second controller of the plurality of controllers and the first single port storage device, wherein the plurality of interconnection lanes is routed between the plurality of controllers and the plurality of single port storage devices via a backplane, wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to cause connectivity between the plurality of single port storage devices and at least one network.

Certain embodiment disclosed herein also include a non-transitory computer readable medium having stored thereon instructions for causing a processing circuitry to execute a process, the process comprising: enabling at least one second interconnection lane of a plurality of interconnection lanes when a first controller of a plurality of controllers has failed, wherein a first interconnection lane of the plurality of interconnection lanes is between the first controller and a first single port storage device of a plurality of single port storage devices, wherein the at least one second interconnection lane is between a second controller of the plurality of controllers and the first single port storage device, wherein the plurality of interconnection lanes is routed between the plurality of controllers and the plurality of single port storage devices via a backplane, wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to cause connectivity between the plurality of single port storage devices and at least one network.

Certain embodiments disclosed herein also include a storage system. The storage system comprises: a backplane; a plurality of single port storage devices; a plurality of controllers, wherein the backplane routes a plurality of interconnection lanes between the plurality of controllers and the plurality of single port storage devices, wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to cause connectivity between the plurality of single port storage devices and at least one network; and a plurality of compute nodes, wherein each compute node of the plurality of compute nodes includes a processing circuitry and a memory, the memory of each compute node containing instructions that, when executed by the processing circuitry of the compute node, configures the compute node to: enable at least one second interconnection lane of the plurality of interconnection lanes when a first controller of the plurality of controllers has failed, wherein a first interconnection lane of the plurality of interconnection lanes is between the first controller and a first single port storage device of the plurality of single port storage devices, wherein the at least one second interconnection lane is between a second controller of the plurality of controllers and the first single port storage device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
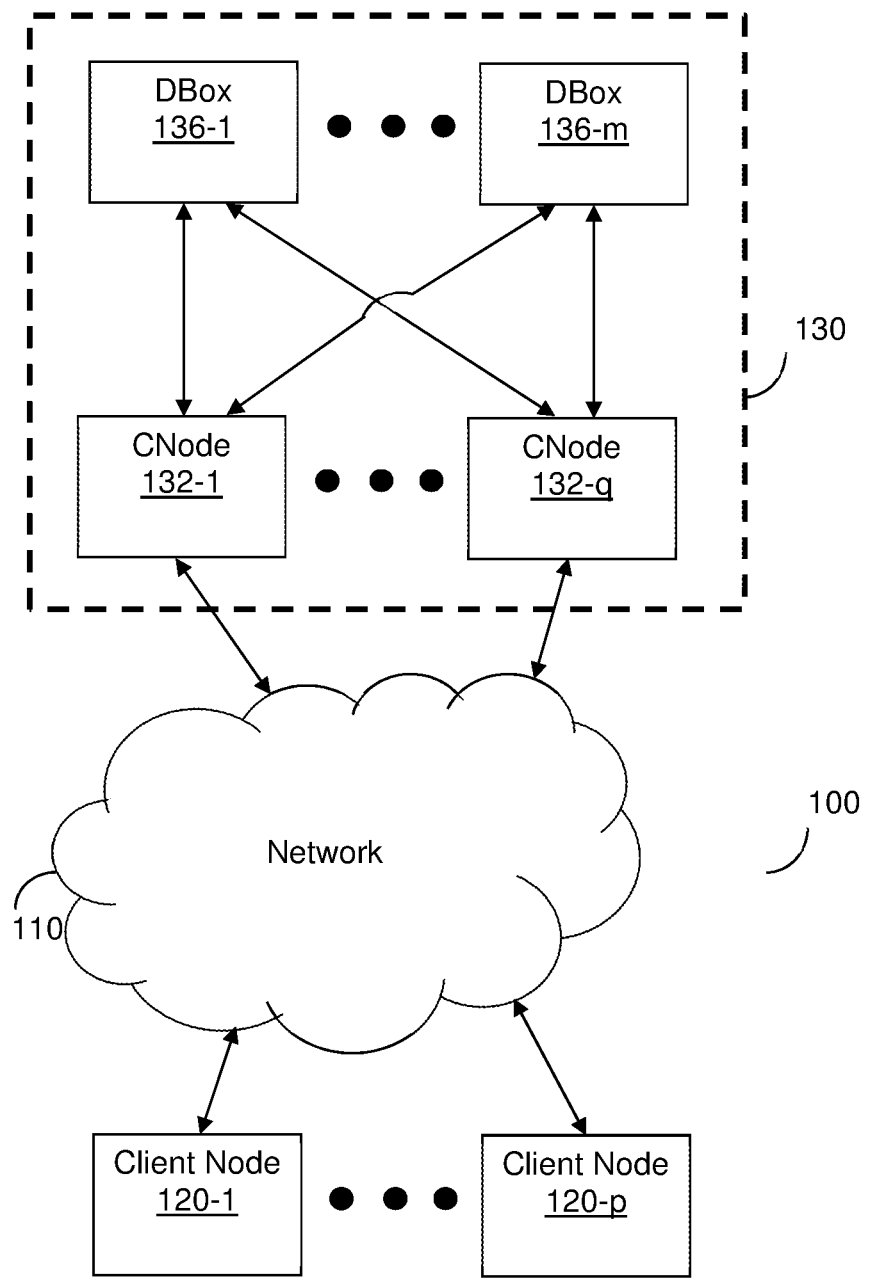
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that passive backplanes or active backplanes lacking switches or other components that allow for dynamically connecting lanes, moving data between lanes, or both, present various advantages that would benefit distributed storage systems using single port storage nodes. For example, passive backplanes do not include complex active components such as microchips and transistors and, therefore, are more robust than active backplanes.

Additionally, single port drives are typically cheaper than dual port drives and are typically used for new types of drives. As a result, the ability to use single port drives opens up more opportunities. To this end, the disclosed embodiments provide techniques and configurations that allow creation of a highly available storage enclosure with passive backplanes (or otherwise simple backplanes without CPUs or switches) and that use single port drives rather than dual port drives.

The techniques described herein take advantage of a PCIe feature known as lane reversal, which was originally designed for simplifying PCB layouts in a novel way. Lane reversal allows a PCIe device to function when lane leads are connected in a reverse order. To this end, it has been identified that lane reversal allows dynamic mapping of single port drives to controllers of a multi-port, multi-controller highly available enclosure. For example, with the right sequence, drives with 4 PCIe lanes can connect to a controller #0 with PCIe lanes 0&1 or to a controller #1 with PCIe lanes 2&3.

More specifically, use of lane reversal according to the disclosed embodiments allow for providing more than single lane bandwidth for single port storage device. The 4 lanes utilized by each single port storage device may be split among different controllers, for example, between two hosts acting as controllers. Lanes may be enabled and disabled in order to effectively remap connections between storage devices and controllers. As a result, the disclosed embodiments provide a redundant system that is highly modular and resilient to host or controller failures.

The various disclosed embodiments provide a storage system including multiple storage devices communicating with controllers via a backplane. More specifically, various disclosed embodiments utilize lane reversal to reverse interconnection lanes between transmitting components (e.g., controllers) and receiving components (e.g., storage devices). To this end, the disclosed embodiments provide configurations which utilize one or two lanes between each set of controller and single port storage device.

The disclosed configurations allow for using highly available enclosures with passive or otherwise simple backplanes in distributed storage systems having single port storage devices rather than requiring use of less robust active backplanes or more expensive dual-port storage devices. Specifically, the backplanes may be, for example, passive backplanes, active backplanes lacking switching circuitry, active backplanes that are hardwired, or active backplanes that are otherwise not configured for dynamic lane switching or moving data between lanes. Accordingly, the disclosed embodiments provide advantages of using passive or otherwise simple backplanes (e.g., backplanes without CPUs or switches) while still allowing for high availability with redundant controller and single port storage devices. Further, various disclosed embodiments may allow for highly modular systems in which many or most components may be swapped as needed (for example, upon or approaching failure). For example, in an embodiment, any components of a storage system except for the backplane and system chassis may be swapped.

FIG. 1 is a network diagram 100 illustrating an example distributed storage system utilized to describe various disclosed embodiments. The network diagram 100 includes a distributed storage system 130, a network 110, and client nodes 120-1 through 120-*p* (referred to as a client node 120 or as client nodes 120 for simplicity).

The distributed storage system 130 includes compute nodes (CNodes) 132-1 through 132-*q* (referred to as a CNode 132 or as CNodes 132 for simplicity) and storage boxes (DBoxes) 134-1 through 134-*m* (referred to as a DBox 136 or as DBoxes 136 for simplicity). In the example distributed storage system 130, the Cnodes 132 communicate with storage devices such as drives (not shown in FIG. 1) via the DBoxes 136 in which the storage devices are located, implement the erasure code, and expose the storage devices to clients (i.e., clients of the client nodes 120) over the network or internally (e.g., if the client nodes 120 are also running on servers used by the CNodes 132).

In an example implementation, the distributed storage system 130 may be configured as described further in U.S. patent application Ser. No. 16/002,676 (the '676 application), assigned to the common assignee, the contents of which are hereby incorporated by reference. It should be noted that the example distributed storage system of the '676 application is described with respect to storage nodes (DNodes), and that DBoxes as described herein may include DNodes that are utilized consistent with the embodiments described therein.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DBoxes 136 include at least non-volatile memories (e.g., Flash, 3D Xpoint), and may further include storage nodes (DNodes, not shown in FIG. 1) realized as combinations of volatile (e.g., RAM) and non-volatile memories. The non-volatile memories may be included in, for example, hard-disk drives (HDDs), solid state drives (SSDs), or a combination thereof. In an example implementation, each DBox 136 includes one or more drives containing disks and one or more storage nodes. An example DBox 136 is described further below with respect to FIG. 2.

The CNodes 132 are configured to access data in the DBoxes 136. In some implementations, the CNodes 132 may be configured to collectively act as a distributed transaction manager for accessing data in the DBoxes 136.

The client node 120 is configured to send access commands to the distributed storage system 130 via the network 110. The CNodes 132 are configured to receive access commands from the client nodes 120 and to access the DBoxes 136 based on the received commands. The access may include translating the received commands into a format supported by the DBoxes 136. As a non-limiting example, NVM Express (NVMe) over Fabrics may be utilized to provide such access.

In an example implementation, each CNode 132 may access all DBoxes 136. In a further example implementation, each CNode 132 is configured to read any data stored in any of the DBoxes 136 and is configured to write data to one or more assigned portions of data stored in the DBoxes 136.

It should be noted that the embodiments described herein are not limited to the arrangement shown in FIG. 1. For example, storage systems to which the disclosed erasure coding techniques may be applied are not limited to the particular configuration of the distributed storage system 130. In particular, a storage system used for the improved erasure coding techniques described herein may utilize a single compute node for managing the multiple storage nodes without departing from the scope of the disclosure. Further, multiple DBoxes, each of which may include one or more storage nodes, may be utilized without departing from the disclosed embodiments.

Figure 2:
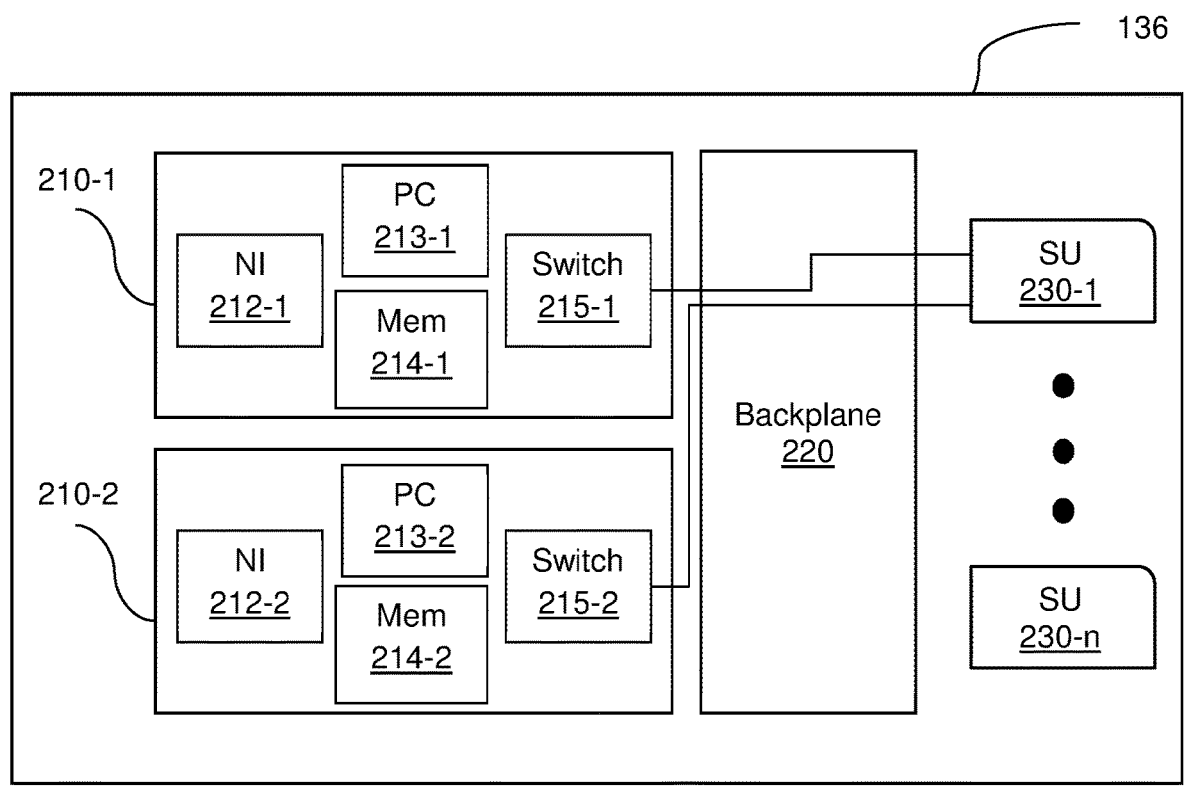
FIG. 2 is a schematic diagram of a storage box according to an embodiment.

FIG. 2 is an example schematic diagram of a DBox 136 according to an embodiment. In an embodiment, the DBox 136 includes one or more hosts 210 (in the example implementation shown in FIG. 2, the DBox 136 includes two hosts 210-1 and 210-2), a backplane 220, and single port storage devices 230-1 through 230-*n* (referred to as a storage device 230 or as storage devices 230 for simplicity).

Each host 210 includes, but is not limited to, a network interface (NI, for example realized using a network interface card) 212, a processing circuitry (PC) 213, a memory (mem) 214, and a switch 215. Each host 210 acts as a controller allowing for, among other things, writing data to and reading data from the storage devices 230 based on requests (e.g., requests from the client node 120, FIG. 1). Each host 210 may be or may include a DNode as described in the '676 application, the contents of which are hereby incorporated by reference. Each host 210 acts as or includes a controller (not shown). Each controller includes at least the processing circuitry 213 and the memory 214.

The network interface 212 is configured to enable communications between the storage devices 230 and at least one network (e.g., communications between the storage devices 230 and the client device 120 via the network 110, FIG. 1).

The processing circuitry 213 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 214 may be volatile (e.g., RAM, etc.), non-volatile (e.g., ROM, flash memory, etc.), or a combination thereof. The memory 214 at least stores instructions that, when executed by the processing circuitry 213, configure the host 210 to perform at least a portion of the disclosed embodiments. More specifically, the hosts 210 are configured to cause or otherwise enable connectivity between the storage devices 230 and a network (e.g., the network 110, FIG. 1) and to enable interconnection lanes between a single port storage device and a second controller (e.g., one of the hosts 210) when a first controller (e.g., another one of the hosts 210) has failed.

Each switch 215 may be, for example, a peripheral component interconnect (PCI) switch for connecting the storage devices 230 to the processing circuitry 213 such as a PCI fan-out switch.

Each of the storage devices 230 is or includes computer hardware on which data can be stored. The storage devices 230 may be, but are not limited to, drives containing disks. More specifically, the storage devices 230 are single port storage devices such as, but not limited to, single port drives. In an example implementation, the storage devices 230 may be modular and freely swapped or otherwise replaced as needed. Each storage device 230 has multiple lanes (not shown), where each lane is to one of the hosts 210.

The backplane 220 is a circuit board including electrical connectors (not shown) for receiving one or more plug-in boards. In an embodiment, the backplane does not include switches or other components allowing for dynamically changing lanes or moving data between lanes. To this end, the backplane may be a passive backplane, an active backplane that is hardwired between the storage devices 230 and the hosts 210, an active backplane lacking switching or other computing circuitry, and the like.

In an embodiment, the backplane 220 is a passive backplane, i.e., a passive circuit board with no or minimal computing circuitry needed for enabling communications via the electrical connectors. To this end, subcomponents of the backplane 220 include passive electrical components such as, but not limited to, connectors, resistors, and capacitors. In an embodiment, the backplane 220 does not include any active bus driving circuitry.

In another embodiment, the backplane 220 is an active backplane that does not include switching circuitry such as PCIe switches. Such a backplane is less complex than active backplanes including PCIe switches and, therefore, provides advantages over such active backplanes including PCIe switches. Such an active backplane may be, but is not limited to, a backplane including computing circuitry consisting of a field programmable gate array (FPGA) or a complex programmable logic device (CPLD).

The backplane 220 routes interconnection lanes (e.g., PCIe lanes) from the storage devices 230 to the hosts 210. In an example implementation, each storage device 230 is a single port drive having 4 PCIe lanes such that the backplane 220 routes two lanes from each storage device 230 to the top host 210-1 and two lanes to the bottom host 210-2. Accordingly, this configuration acts like a storage system utilizing dual port drives.

In an example implementation, during normal operation, half of the storage devices 230 are utilized by the top host 210-1 and the other half of the storage devices 230 are utilized by the bottom host 210-2. As a non-limiting example, when the storage devices 230 include 6 single port drives 230-1 through 230-6, the top host 210-1 may utilize the storage devices 230-1 through 230-3 and the bottom host 210-2 may utilize the storage devices 230-4 through 230-6.

The hosts 210 are configured to communicate either with each other or with an external entity, for example, to decide on mapping for the storage devices 230. The utilization may be in the form of mapping or otherwise in the form of enabling lanes between host 210 and storage device 230.

Once mapping is decided, each host 210 is configured to enable ports of the switch 216 connected to each storage device 230 that the host 210 is connected to in order to enable interconnection lanes between the hosts 210 and the storage devices 230 according to the mapping. On startup, each storage device 230 detects that only two lanes are active and connects to those two active lanes. As a non-limiting example, a storage device 230-1 may connect to lanes 0 and 1 of the bottom host 210-1 or lanes 2 and 3 of the top host 210-2. This connection is realized using lane reversal.

Figure 4A:
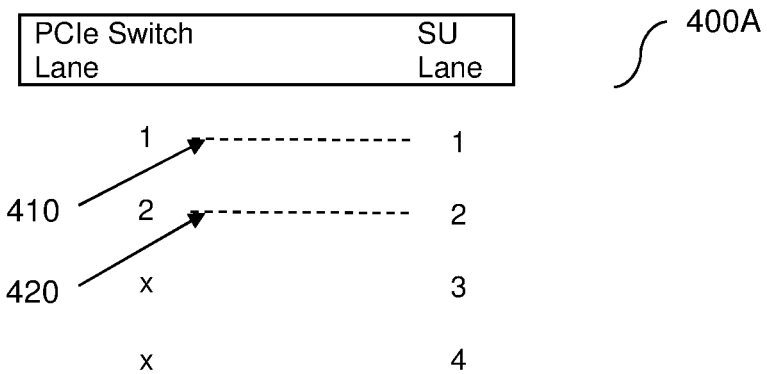
FIGS. 4A and 4B are lane configurations utilized in accordance with one embodiment.
Figure 4B:
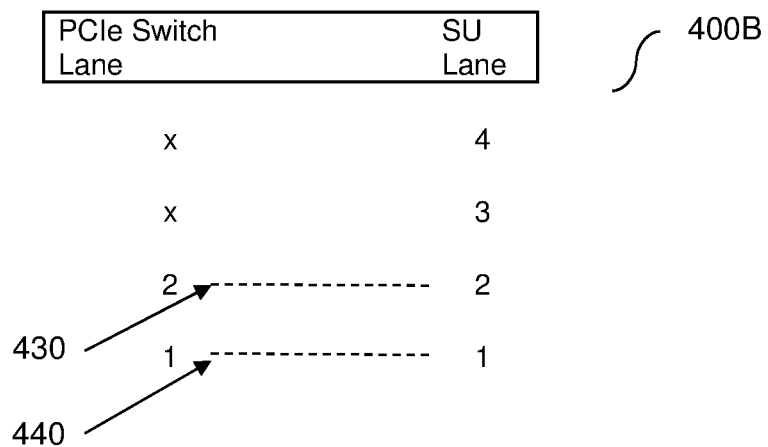

Examples configurations for lanes are shown in FIGS. 4A-B. FIGS. 4A-4B show example lane configurations 400A and 400B that may be utilized in accordance with the disclosed embodiments.

FIG. 4A shows an example lane configuration 400A when a first host (e.g., the top host 210-1, FIG. 2) is connected to a storage device (e.g., the storage device 230-1). Specifically, FIG. 4A shows connections 410 and 420 between respective PCIe switch lanes of the first host and lanes of the storage device. In the example implementation shown in FIG. 4A, PCIe switch lanes 1 and 2 of the first host are connected to lanes 1 and 2, respectively, of the storage device. In an embodiment, each of the storage devices supports lane reversal such that each storage device is capable of functioning using only 2 PCIe lanes. In a further embodiment, each of the storage devices further supports use of peripheral component interconnect express (PCIe) separate reference clock with no spread spectrum clocking (SRNS) or separate reference clock with spread spectrum clocking (SRIS).

FIG. 4B shows an example lane configuration 400A when a first host (e.g., the bottom host 210-2, FIG. 2) is connected to a storage device (e.g., the storage device 230-1). Specifically, FIG. 4B shows connections 430 and 440 between respective PCIe switch lanes of the second host and lanes of the storage device. In the example implementation shown in FIG. 4B, PCIe switch lanes 2 and 1 of the second host are connected to lanes 2 and 1, respectively, of the storage device. This alternate configuration is possible when both the storage device and the host support lane reversal.

Returning to FIG. 2, when a first host of the hosts 210 has failed, the second active host 210 is configured to check to see if the failed host 210 is actually not functioning. The failed first host 210 stops driving its respective lanes. The storage devices 230 previously connected to the failed first host 210 are now connected to the active second host 210. To this end, one or more lanes between the second host 210 and the storage devices 230 previously connected to the failed first host 210 are now enabled.

When the first host 210 is back up, the hosts 210 is configured to select which of the storage devices 230 should be assigned to the first host 210. The second host 210 is configured to disable lanes and power to the selected storage devices 230, and the first host 210 may enable the lanes between the first host 210 and the selected storage devices 230. Each DBox 136 is an enclosure that is configured to cause the backplane 220 provide power to the storage devices 230. By reconfiguring the other host 210 when one host 210 has failed, the DBox 136 is configured to maintain access to all storage devices 230 as long as one of the hosts 210 is functional.

It should be noted that the schematic diagram of FIG. 2 is an example, and that DBoxes or other storage devices having different configurations may be utilized in accordance with the disclosed embodiments. In particular, two hosts are shown in FIG. 2, but other numbers of hosts may be used. In an embodiment, up to four hosts may be used. The increased numbers of hosts may be used to, for example, increase redundancy. In an embodiment, the number of hosts used depends on the number of interconnection lanes used by the single pot storage devices. Additionally, controllers other than hosts or controllers included in hosts may be equally utilized.

Figure 3:
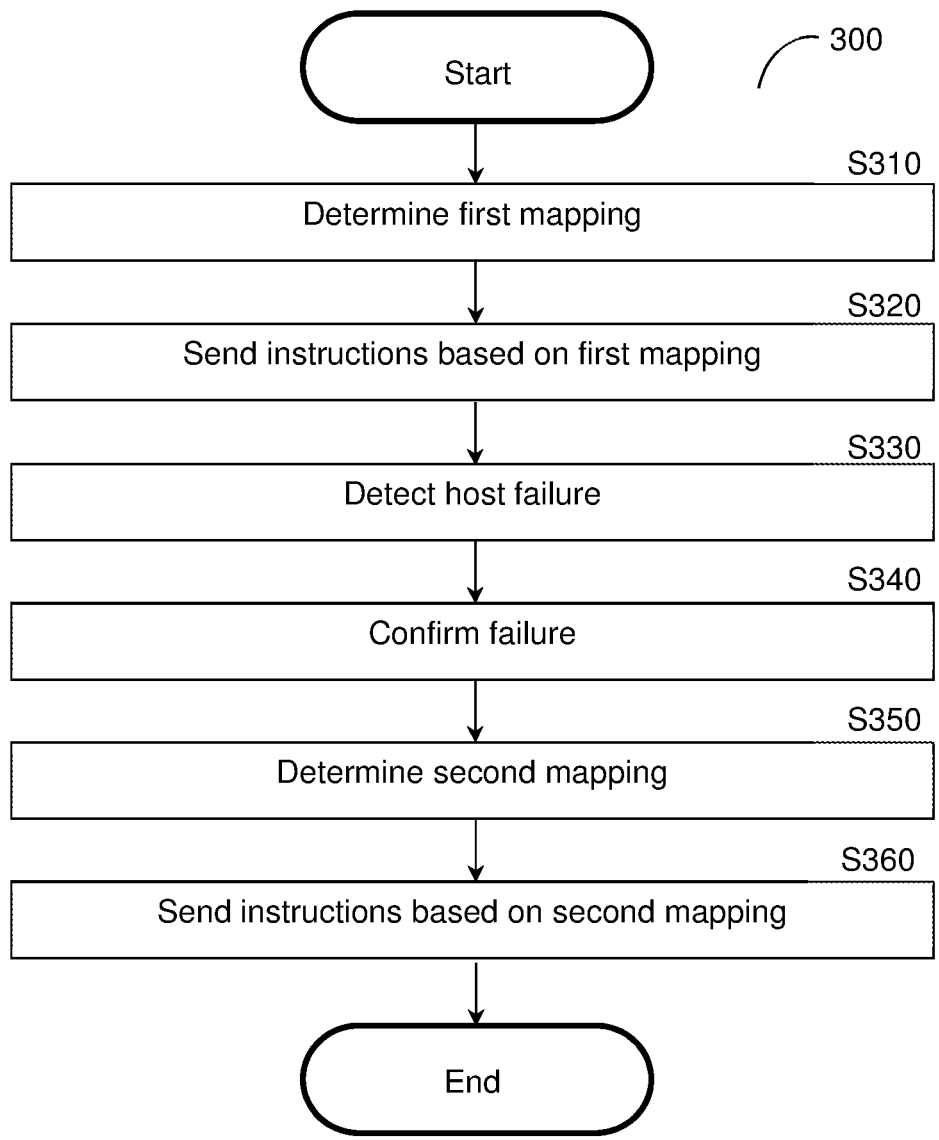
FIG. 3 is a flowchart illustrating a method for operation of a storage system utilizing a backplane and single port storage devices according to an embodiment.

FIG. 3 is an example flowchart 300 illustrating a method for operation of a storage system utilizing a backplane and single port storage devices according to an embodiment. In an embodiment, the method is performed by one of the CNodes 132, FIG. 1.

The method is described with respect to one of the hosts 210-1 or 210-2 failing. Other implementations may utilize different numbers of hosts without departing from the scope of the disclosure. Such implementations include splitting power providing responsibilities among remaining hosts accordingly (e.g., dividing the storage devices provided power from among 3 remaining hosts instead of 1 remaining host).

The embodiments described with respect to FIG. 3 are described with respect to mappings between controllers (e.g., one of the hosts 210 or another controller) and storage devices. In an example implementation in which two hosts are utilized, four possible mappings are utilized: all storage devices mapped to a first host, all storage devices mapped to a second host, half of the storage devices mapped to each host, or no storage devices mapped to any hosts (e.g., prior to use). When a host is mapped to a storage device, lanes between the host and the storage device are enabled during normal operation (i.e., when the storage device is not failed).

At S310, a first mapping of storage devices is determined. Each controller 210 is mapped to one or more storage devices 230. The first mapping is determined based on a number of controllers 210 and may be a default or otherwise initial mapping. In an example implementation, the first mapping includes half of the storage devices 230 being mapped to each controller 210 when there are two hosts 210-1 and 210-2. In a further example, prior to implementation of the first mapping, no drives may be mapped.

At S320, instructions are sent to a DBox 136 containing the storage devices 230 based on the first mapping. The instructions are for configuring each storage device 230 to connect to the host 210 that it is mapped to. When the instructions are executed, lanes between the storage devices 230 and their respective mapped hosts 210 are enabled. When the storage devices 230 have been provided power, each storage device 230 detects that two lanes are active and connects to its respective mapped host using its two active lanes. Connecting to only two active lanes is enabled by using lane reversal. In an example implementation, the storage devices mapped to the host 210-1 connect to active lanes 0,1.

At S330, a failure of one of the hosts 210 is detected. When one of the hosts 210 has failed, the failed host 210 stops driving the respective lanes and stops providing power to its mapped storage devices 230.

At optional S340, the detected failure is confirmed. In an embodiment, S340 includes utilizing side band signals to a baseboard management controller of the failed host 210.

At S350, when a failure of one of the hosts 210 is detected, a second mapping is determined. The second mapping is for connecting the remaining host 210 (i.e., the host that did not fail) to the storage devices previously mapped to the failed host. When the hosts 210 include more than two hosts, the second mapping is for distributing the storage devices previously mapped to the failed host among the remaining hosts.

At S360, instructions are sent to a DBox 136 containing the storage devices 230 based on the second mapping. The instructions are for configuring each storage device 230 to connect to the remaining host 210. When the instructions are executed, lanes between the storage devices 230 and the remaining hosts 210 are enabled according to the second mapping. When the storage devices 230 have been provided power, each storage device 230 detects that two lanes are active and connects to it's remaining host using its two active lanes.

In an embodiment, the instructions further provide for causing the storage devices to return to using the first mapping when certain conditions are met. To this end, the instructions may include instructions for causing the storage devices to attempt to reconnect to all active lanes when a link drop has occurred, attempt to reconnect to all active lanes when the storage device is powered up, to attempt to reconnect to all active lanes when the a reset signal (e.g., "PCIE_PERST#") is deasserted, to attempt to reconnect to each of its lanes after every link drop (i.e., when a connection to one or more lanes is lost), to attempt to reconnect to all active lanes when a command to connect to interconnection lanes is received (e.g., an explicit command to connect to specific lanes or an implicit command to connect to lanes generally), or a combination thereof. In this regard, it has been identified that, although performing power cycling by powering down storage devices mapped to the failed host and powering up those storage devices by the remaining host can be utilized to provide power in case of failure of one of the hosts, such power cycling results in long transition times. Reconfiguring the storage devices to attempt to reconnect when some of the above conditions are met allows for switching to the second mapping without requiring power cycling.

Figure 5:
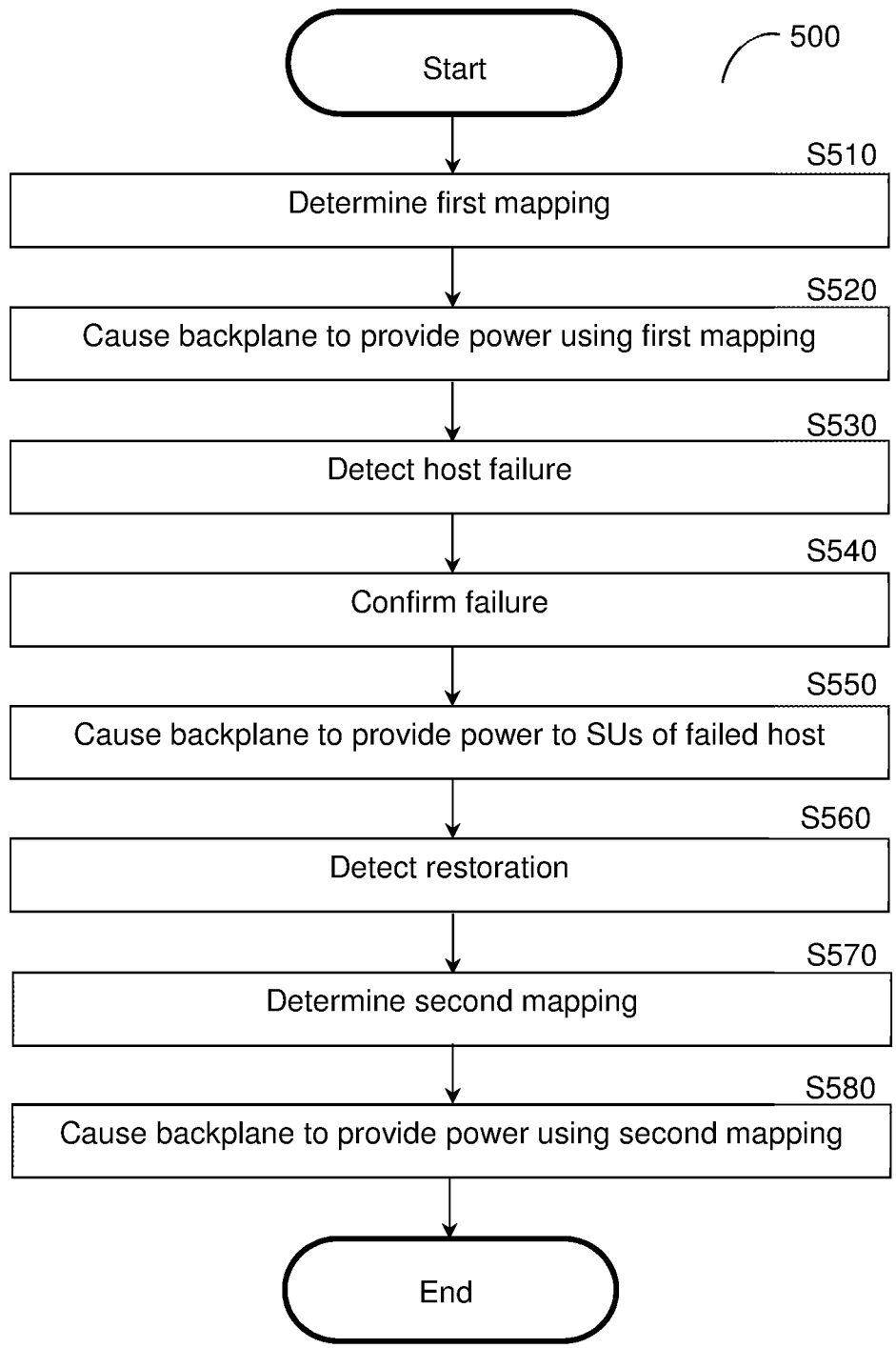
FIG. 5 is an example flowchart illustrating an alternative method for operation of a storage system utilizing a backplane and single port storage devices according to an embodiment.

FIG. 5 is an example flowchart 500 illustrating an alternative method for operation of a storage system utilizing a backplane and single port storage devices according to an embodiment. In an embodiment, the method is performed by one of the hosts 210, FIG. 2. The alternative method described with respect to FIG. 5 is a power cycling-based method.

More specifically, the method is described with respect to one of the hosts 210 failing. For purposes of simplicity, FIG. 5 is described from the perspective of the host 210-1 that remains active during the failure of the other host 210-2. The specific host that fails and that remains active are not limited to the reference numbers described with respect to FIG. 5. For example, the host 210-2 may remain active during the failure of the other host 210-1 without departing from the scope of the disclosed embodiments. In such a case, the full method (i.e., including all steps illustrated in FIG. 3) is performed by the host 210-2.

Further, portions of the method may be performed by the other host 210-2 before failure and after it is back up without departing from the scope of the disclosure. In particular, steps S510 and S520 may be performed to establish storage device mapping and to initialize storage devices mapped to the host 210-2 prior to the host 210-2 failing.

Additionally, other implementations may utilize different numbers of hosts without departing from the scope of the disclosure. Such implementations include splitting power providing responsibilities among remaining hosts accordingly (e.g., dividing the storage devices provided power from among 3 remaining hosts instead of 1 remaining host).

At S510, a first storage device mapping determined. The host 210-1 is mapped to one or more storage devices. In an embodiment, S310 includes communicating with the other host(s) 210 in order to mutually decide on storage device mappings for each host 210. Alternatively, S510 may include communicating with an external entity (e.g., a host manager) that is configured to determine mappings among multiple hosts.

At S520, lanes between storage devices and the host 210-1 are enabled according to the first storage device mapping. In an embodiment, S520 includes enabling a switch port connected to each mapped storage device and enabling the lanes to each storage device connected via switch port.

When the respective lanes have been enabled, each storage device detects that two lanes are active and connects to its respective two active lanes. Connecting to only two active lanes is enabled by using lane reversal. In an example implementation, the storage devices mapped to the host 210-1 connect to active lanes 0,1.

At S530, a failure of the host 210-2 is detected. When the host 210-2 has failed, the failed host 210-2 stops driving the respective lanes and stops providing power to its mapped storage devices.

At optional S540, the detected failure will be confirmed. In an embodiment, S340 includes utilizing side band signals to a baseboard management controller of the host 210-2.

At S550, when a failure of the other host 210-2 is detected, storage devices (SUs) mapped to the failed host 210-2 are provided power by the remaining active host 210-1. To this end, the active host 210-1 may enable the ports connected to these storage devices and cause the backplane 220 to enable the lanes to these storage devices.

At S560, restoration of the failed host 210-2 is detected.

At S570, a second storage device mapping is determined. In an embodiment, S370 includes communicating with the other host(s) 210 in order to mutually decide on storage device mappings for each host 210. Alternatively, S570 may include communicating with an external entity (e.g., a host manager) that is configured to determine mappings among multiple hosts.

At S580, lanes are enabled according to the second storage mapping. To this end, in an embodiment, S580 includes the host 210-1 disabling lanes to power to the storage devices it is no longer mapped to. The host 210-2 may enable ports and cause the backplane 220 to enable the lanes to its newly mapped storage devices.

It should be noted that various embodiments are discussed with reference to hosts acting as controllers, but that other controllers may equally be used in accordance with the disclosure.

The various embodiments disclosed herein can be implemented as hardware, firmware, software, or any combination thereof. Moreover, the software is preferably implemented as an application program tangibly embodied on a program storage device or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage device and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A storage system, comprising:
a backplane;
a plurality of single port storage devices; and
a plurality of controllers, wherein the backplane includes a plurality of interconnection lanes and lacks switching circuitry, wherein each single port storage device is physically connected to the backplane via a subset of the plurality of interconnection lanes and is configured to:
detect that a first portion of interconnection lanes of the subset is enabled, to connect to the first portion of interconnection lanes and to communicate with one of the plurality of controllers via the first portion of interconnection lanes,
wherein the plurality of controllers is configured to:
enable a second portion of interconnection lanes of the subset of the plurality of interconnection lanes, when a first controller of the plurality of controllers has failed, wherein the first portion of interconnection lanes of the subset of the plurality of interconnection lanes is between the first controller and a first single port storage device of the plurality of single port storage devices, wherein the second portion of interconnection lanes is between a second controller of the plurality of controllers and the first single port storage device.

2. The storage system of claim 1, wherein the plurality of controllers is configured to cause connectivity between the plurality of single port storage devices and at least one network, and wherein access to each of the plurality of storage devices via the at least one network is maintained as long as at least one of the plurality of controllers is functional.

3. The storage system of claim 1, wherein the plurality of controllers is further configured to:
disable the second portion of interconnection lanes when the first controller is restored; and
enable the first portion of interconnection lanes when the first controller is restored.

4. The storage system of claim 1, wherein the plurality of controllers includes a number of controllers, wherein the number of controllers is based on the number of interconnection lanes of the plurality of single port storage devices.

5. The storage system of claim 1, wherein the backplane does not include peripheral component interconnect express (PCIe) switches.

6. The storage system of claim 1, wherein the backplane is a passive backplane.

7. The storage system of claim 1, wherein the backplane is hardwired between the plurality of single port storage devices and the plurality of controllers.

8. The storage system of claim 1, wherein the backplane is not configured to perform any of: dynamically connecting the plurality of interconnection lanes, and moving data between interconnection lanes of the plurality of interconnection lanes.

9. The storage system of claim 1, wherein each single port storage device supports use of lane reversal.

10. The storage system of claim 9, wherein each single port storage device further supports use of peripheral component interconnect express (PCIe) separate reference clock with no spread spectrum clocking (SRNS) or separate reference clock with spread spectrum clocking (SRIS).

11. The storage system of claim 1, wherein each single port storage device communicates with one of the plurality of controllers via two of the plurality of interconnection lanes.

12. The storage system of claim 1, wherein the first single port storage device is configured to:
attempt to reconnect to at least one first interconnection lane of the subset when a link drop has occurred.

13. The storage system of claim 1, wherein the subset of the plurality of interconnection lanes is routed between the first single port storage unit and the plurality of controllers, wherein the first single port storage device is configured to:
attempt to reconnect to the subset of the plurality of interconnection lanes when a PCIE_PERST# signal is deasserted.

14. The system of claim 1, wherein the first single port storage device is configured to:
attempt to reconnect to at least one first interconnection lane of the subset when the first single port storage device receives a command to connect to interconnection lanes.

15. A method for redundant control over single port storage devices, comprising:
enabling at least one second interconnection lane of a plurality of interconnection lanes when a first controller of a plurality of controllers has failed, wherein a first interconnection lane of the plurality of interconnection lanes is between the first controller and a first single port storage device of a plurality of single port storage devices, wherein the at least one second interconnection lane is between a second controller of the plurality of controllers and the first single port storage device, wherein the plurality of interconnection lanes is included in a backplane that lacks switching circuitry,
detecting, by the first single port storage device, that the at least one second interconnection lane is enabled; and
attempting, by the first single port storage device, to connect to the at least one second interconnection lane;
wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to cause connectivity between the plurality of single port storage devices and at least one network.

16. The method of claim 15, further comprising:
disabling the at least one second interconnection lane when the first controller is restored; and
enabling the at least one first interconnection lane when the first controller is restored.

17. The method of claim 15, wherein each single port storage device supports use of lane reversal.

18. The method of claim 15, wherein each single port storage device further supports use of peripheral component interconnect express (PCIe) separate reference clock with no spread spectrum clocking (SRNS) or separate reference clock with spread spectrum clocking (SRIS).

19. The method of claim 15, wherein the backplane is a passive backplane.

20. The method of claim 15, wherein the backplane is hardwired between the plurality of single port storage devices and the plurality of controllers.

21. A non-transitory computer readable medium having stored thereon instructions for causing a processing circuitry to execute a process, the process comprising:
enabling at least one second interconnection lane of a plurality of interconnection lanes when a first controller of a plurality of controllers has failed, wherein a first interconnection lane of the plurality of interconnection lanes is between the first controller and a first single port storage device of a plurality of single port storage devices, wherein the at least one second interconnection lane is between a second controller of the plurality of controllers and the first single port storage device, wherein the plurality of interconnection lanes is included in a backplane that lacks switching circuitry,
detecting, by the first single port storage device, that the at least one second interconnection lane is enabled; and
attempting, by the first single port storage device, to connect to the at least one second interconnection lane;
wherein each single port storage device is configured to communicate with one of the plurality of controllers via at least one of the plurality of interconnection lanes when the at least one of the plurality of interconnection lanes between the single port storage device and the controller is enabled, wherein the plurality of controllers is configured to cause connectivity between the plurality of single port storage devices and at least one network.

22. A storage system, comprising:
a backplane;
a plurality of single port storage devices;

a plurality of controllers, wherein the backplane includes a plurality of interconnection lanes and lacks switching circuitry, wherein each single port storage device is physically connected to the backplane via a subset of the plurality of interconnection lanes and is configured to:

detect that a first portion of interconnection lanes of the subset is enabled, to connect to the first portion of interconnection lanes and to communicate with one of the plurality of controllers via the first portion of interconnection lanes, wherein the plurality of controllers is configured to cause connectivity between the plurality of single port storage devices and at least one network; and a plurality of compute nodes, wherein each compute node of the plurality of compute nodes includes a processing circuitry and a memory, the memory of each compute node containing instructions that, when executed by the processing circuitry of the compute node, configures the compute node to:

enable a second portion of interconnection lanes of the subset of the plurality of interconnection lanes, when a first controller of the plurality of controllers has failed, wherein the first portion of interconnection lanes of the subset of the plurality of interconnection lanes is between the first controller and a first single port storage device of the plurality of single port storage devices, wherein the second portion of interconnection lanes is between a second controller of the plurality of controllers and the first single port storage device.

* * * * *